United States Patent
Hähnle et al.

(10) Patent No.: US 7,220,821 B2
(45) Date of Patent: May 22, 2007

(54) PROCESS FOR THE REDUCTION OF THE RESIDUAL MONOMER CONTENT OF WATER-ABSORBENT FOAM

(75) Inventors: Hans-Joachim Hähnle, Neustadt (DE); Rüdiger Funk, Niedernhausen (DE); Wolfgang Heider, Neustadt (DE); Gunnar Schornick, Neuleiningen (DE); Volker Frenz, Mainz-Kostheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/502,135

(22) PCT Filed: Jan. 30, 2003

(86) PCT No.: PCT/EP03/00923

§ 371 (c)(1), (2), (4) Date: Jul. 19, 2004

(87) PCT Pub. No.: WO03/066717

PCT Pub. Date: Aug. 14, 2003

(65) Prior Publication Data

US 2005/0085559 A1    Apr. 21, 2005

Related U.S. Application Data

(60) Provisional application No. 60/353,205, filed on Feb. 4, 2002.

(51) Int. Cl.
*C08F 6/00* (2006.01)

(52) U.S. Cl. ............... 528/480; 156/202; 156/269; 521/50; 521/64; 526/294; 526/329; 604/369; 604/385.01

(58) Field of Classification Search ........... 156/202, 156/269; 521/50, 64; 526/294, 329; 528/480; 604/369, 385.01
See application file for complete search history.

(56) References Cited

U.S. PATENT DOCUMENTS

| | | | |
|---|---|---|---|
| 4,147,845 A * | 4/1979 | Petersen | ............... 521/56 |
| 4,394,930 A | 7/1983 | Korpman | |
| 4,415,388 A | 11/1983 | Korpman | |
| 4,529,739 A | 7/1985 | Scott et al. | |
| 4,649,164 A | 3/1987 | Scott et al. | |
| 4,766,173 A * | 8/1988 | Bailey et al. | ............... 524/819 |
| 4,808,637 A | 2/1989 | Boardman et al. | |
| 5,182,312 A | 1/1993 | Engelhardt et al. | |
| 5,214,075 A | 5/1993 | Engelhardt et al. | |
| 5,236,965 A | 8/1993 | Engelhardt et al. | |
| 5,712,316 A | 1/1998 | Dahmen et al. | |
| 5,948,829 A * | 9/1999 | Wallajapet et al. | ............ 521/64 |
| 6,174,929 B1 | 1/2001 | Hahnle et al. | |
| 6,455,600 B1 | 9/2002 | Hahnle et al. | |
| 2003/0003284 A1 | 1/2003 | Schwertfeger et al. | |
| 2004/0046151 A1 * | 3/2004 | Saija et al. | ................ 252/500 |

FOREIGN PATENT DOCUMENTS

| | | |
|---|---|---|
| EP | 0 421 264 | 4/1991 |
| GB | 2 136 813 | 9/1984 |
| WO | WO 88/09801 | 12/1988 |
| WO | WO 94/22502 | 10/1994 |
| WO | WO 95/02002 | 1/1995 |
| WO | WO 97/37971 | 9/1997 |
| WO | WO 98/32602 | 7/1998 |
| WO | WO 99/44648 | 9/1999 |
| WO | WO 00/52087 | 9/2000 |

OTHER PUBLICATIONS

U.S. Appl. No. 09/926,110.

* cited by examiner

*Primary Examiner*—Terressa Boykin
(74) *Attorney, Agent, or Firm*—Marshall, Gerstein & Borun LLP (57) ABSTRACT

A process for the reduction of the residual monomer content and enhancement of the wet strength of articles formed from water absorbent crosslinked polymer foams containing units derived from monoethylenically unsaturated acids, which comprises treating the formed articles with at least 0.5% by weight of a polymer containing primary and/or secondary amino groups and having a molar mass of at least 300, the formed foam articles thus obtainable and use of the wet strength enhanced formed foam articles in hygiene articles.

12 Claims, 1 Drawing Sheet

Figure 1

PROCESS FOR THE REDUCTION OF THE RESIDUAL MONOMER CONTENT OF WATER-ABSORBENT FOAM

CROSS-REFERENCE TO RELATED APPLICATION

This is the U.S. national phase application of International Application No. PCT/EP03/00923, filed Jan. 30, 2003, which claims the benefit of U.S. provisional patent application Ser. No. 60/353,205, filed Feb. 4, 2002.

The present invention relates to a process for the reduction of the residual monomer content and enhancement of the wet strength of articles formed from water-absorbent crosslinked polymer foams containing units derived from monoethylenically unsaturated acids, the formed foam articles obtainable by the process and the use of the formed foam articles in hygiene articles.

Water-absorbent polymer foams containing units derived from monoethylenically unsaturated acids are obtainable for example by mixing a prefabricated superabsorbent with a polyhydroxy compound and a blowing agent in an extruder at elevated temperature. As the mixture is expressed from the extruder, the foam forms. Processes of this kind are described for example in U.S. Pat. No. 4,394,930, U.S. Pat. No. 4,415,388 and GB-A-2 136 813.

U.S. Pat. No. 4,529,739 and U.S. Pat. No. 4,649,154 discloses processes for producing foams by foaming a water swellable COOH-bearing material with a blowing agent which releases the blowing gas in a neutralizing reaction with the COOH groups of the polymer.

According to WO-A-94/22502, superabsorbent foams based on crosslinked, partly neutralized polycarboxylates are prepared by foaming a monomer mixture with a water-insoluble blowing agent which has a boiling point below 50° C. and polymerizing the foam at virtually the same time as the foaming.

EP-A-0421 264 discloses the production of foamlike superabsorbents by polymerizing an aqueous monomer mixture containing an emulsified oil phase. The oil serves to occupy the space for the later pores in the foam and is removed by evaporation, after the polymerization has ended, on drying the expanded material.

WO-A-88/09801 discloses that it is possible to process hydrophilic polymers, for example sodium polyacrylate, in the presence of crosslinkers such as polyepoxides and blowing agents, by heating, to form a superabsorbent in the form of a foam.

Another known way to produce expanded superabsorbents is to add carbonates, bicarbonates or carbon dioxide as a blowing agent to a mixture of carboxyl-bearing monomers, crosslinker and polymerization initiator, with the polymerization of the monomers being started at the same time as the addition of the blowing agent or shortly thereafter. The superabsorbent acquires a foam structure due to the carbon dioxide formed in the neutralizing reaction, cf. EP-A-2 954 438 and U.S. Pat. No. 4,808,637. In the process disclosed in WO-A-95/02002, an expanded superabsorbent, after production, is admixed with one or more reactive compounds for subsequent surface crosslinking, and is heated to 100–300° C.

Other water-absorbent crosslinked polymer foams containing units derived from acid-functional monoethylenically unsaturated monomers are known from WO-A-97/31971 and WO-A-00/52087. They are produced for example by a two-stage process where, in the first process stage, a polymerizable aqueous mixture containing acid-functional monoethylenically unsaturated monomers which are at least 50 mol % neutralized is foamed by dispersing fine bubbles or a gas inert to free radicals or by dissolving such a gas under a pressure from 2 to 400 bar and subsequent decompressing to atmospheric and, in the second process stage, the foamed mixture is polymerized to form a foamlike hydrogel.

WO-A-99/44648 likewise discloses water-absorbent foamlike crosslinked polymers which are obtainable by the two-stage processes described above, although at least 20 mol % of the acid-functional monomers are neutralized with tertiary alkanolamines and/or the free acid groups of the foamlike hydrogel are at least 20 mol % neutralized with at least one alkanolamine after polymerization. The foams thus produced are flexible under application relevant conditions.

The foams obtainable by the prior art described above have a high residual monomer content.

In order that superabsorbent foams be useful in hygiene articles, the superabsorbent polymers prepared by polymerization of acrylic acid have to have a low residual monomer content. The residual acrylic acid level in these products should preferably be below 500 ppm. This can be ensured by appropriate measures in the course of foam production, for example appropriately long polymerization times, drying techniques, etc. However, these measures not always sufficient and add to the investment needed and hence to the manufacturing costs for the foams.

It is an object of the present invention to provide a process for enhancement of the wet strength of water-absorbent crosslinked foams produced according to existing processes.

We have found that this object is achieved according to the invention by a process for the reduction of the residual monomer content and enhancement of the wet strength of articles formed from water absorbent crosslinked polymer foams containing units derived from monoethylenically unsaturated acids, which comprises treating the formed articles with at least 0.5% by weight of a polymer containing primary and/or secondary amino groups and having a molar mass of at least 300.

Articles formed from water-absorbent crosslinked polymer foams are known from the prior art reported above. Formed foam articles known therefrom can all be treated by the process according to the invention in order that their residual monomer content is reduced and their wet strength may be improved simultaneously. It is preferable to apply the treatment according to the invention to foams obtainable by the two-stage processes known from WO-A-97/31971, WO-A-99/44648 and WO-A-00/52087, for example by (I) foaming a polymerizable aqueous mixture of
  (a) acid-functional monoethylenically unsaturated monomers which are optionally neutralized,
  (b) optionally other monoethylenically unsaturated monomers,
  (c) crosslinkers,
  (d) initiators,
  (e) from 0.1 to 20% by weight of at least one surfactant,
  (f) optionally at least one solubilizer and
  (g) optionally thickeners, foam stabilizers, polymerization regulators, fillers and/or cell nucleators
  by dissolving a gas which is inert toward free radicals in the polymerizable aqueous mixture under a pressure of from 2 to 400 bar and subsequently decompressing the polymerizable aqueous mixture to atmospheric or by dispersing fine bubbles of a gas inert toward free radicals, and
(II) polymerizing the foamed mixture to form a foamlike hydrogel and, if appropriate, adjusting the water content of the foamlike polymer to 1–60% by weight.

Preference is given to those water-absorbent crosslinked polymer foams which are obtainable by neutralizing the acid-functional monomers (a) with tertiary alkanolamines and/or by neutralizing the free acid groups of the hydrogel foam with at least one alkanolamine after polymerization, the degree of neutralization being in either case at least 20 mol % and preferably at least 40 mol %.

Any tackiness on the part of the foamed material can be solved by additional powdering with finely divided hydrophilic powders.

The polymerizable aqueous mixture is processed into a foam which is processing stable and formable into any shape. The polymerizable aqueous mixture contains as component (a) an acid-functional monoethylenically unsaturated monomer which is optionally neutralized. Monomers of this type include for example monoethylenically unsaturated $C_3$–$C_{25}$-carboxylic acids or anhydrides, for example acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid and fumaric acid.

Useful group (a) monomers further include monoethylenically unsaturated sulfonic acids, for example vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, vinylphosphonic acid, allylphosphonic acid and 2-acrylamido-2-methylpropanesulfonic acid. The monomers can be used alone or mixed with each other to produce the superabsorbent foams. Preferred monomers of group (a) are acrylic acid, methacrylic acid, vinylsulfonic acid, acrylamidopropanesulfonic acid or mixtures thereof, for example mixtures of acrylic acid and methacrylic acid, mixtures of acrylic acid and acrylamidopropanesulfonic acid or mixtures of acrylic acid and vinylsulfonic acid.

The monomers are neutralized, if appropriate. Useful neutralizing agents include for example alkali metal bases or ammonia or amines. Preferred neutralizing agents are aqueous sodium hydroxide solution and aqueous potassium hydroxide solution. However, neutralization can also be effected using sodium carbonate, sodium bicarbonate, potassium carbonate or potassium bicarbonate or other carbonates, bicarbonates or ammonia. The acid groups in the monomers are for example 15–90 mol % neutralized with at least one of the bases indicated above.

The polymerizable aqueous mixture can contain monomers of group (b), if appropriate. Monomers of group (b) are other monoethylenically unsaturated monomers which are copolymerizable with the monomers (a) and (c). They include for example the amides and nitriles of monoethylenically unsaturated carboxylic acids, for example acrylamide, methacrylamide and N-vinylformamide, acrylonitrile and methacrylonitrile, dialkyldiallylammonium halides such as dimethyldiallylammonium chloride, dimethyldiallylammonium chloride, allylpiperidinium bromide, N-vinylimidazoles such as for example N-vinylimidazole, 1-vinyl-2-methylimidazole and N-vinylimidazolines such as N-vinylimidazoline, 1-vinyl-2-methylimidazoline, 1-vinyl-2-ethylimidazoline or 1-vinyl-2-propylimidazoline, which are each usable in the form of the free bases, in quaternized form or as a salt in the polymerization. Also suitable are dialkylaminoalkyl acrylates and dialkylaminoalkyl methacrylates, dimethylaminoethyl acrylate, dimethylaminoethyl methacrylate, diethylaminoethyl acrylate and diethylaminoethyl methacrylate. The basic esters are preferably used in quaternized form or as a salt. Useful compounds of group (b) further include for example vinyl esters of saturated $C_1$–$C_4$-carboxylic acids such as vinyl formate, vinyl acetate or vinyl propionate, alkyl vinyl ethers having at least 2 carbon atoms in the alkyl group, for example ethyl vinyl ether or butyl vinyl ether, esters of monoethylenically unsaturated $C_3$–$C_6$-carboxylic acids, for example esters of monohydric $C_1$–$C_{18}$-alcohols and acrylic acid, methacrylic acid or maleic acid, monoesters of maleic acid, for example monomethyl maleate. Other useful monomers of group (b) are styrene, alkyl-substituted styrenes such as ethylstyrene or tert-butylstyrene.

The monomers of group (b) can also be used in a mixture with each other in the copolymerization with the monomers (a) and (c), for example mixtures of vinyl acetate and ethyl acrylate in any desired proportion.

The group (c) monomers have at least 2 ethylenic double bonds. Examples of monomers of this type, which are normally used as crosslinkers in polymerization reactions, are N,N'-methylenebisacrylamide, polyethylene glycol diacrylates and polyethylene glycol dimethacrylates which are derived in each case from polyethylene glycols with a molecular weight $M_w$ of from 106 to 8500, preferably 400 to 2000, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, allyl methacrylate diacrylates and dimethacrylates of block copolymers of ethylene oxide and propylene oxide, polyhydric alcohols such as glycerol or pentaerythritol which are esterified two or three times with acrylic acid or methacrylic acid, triallylamine, tetraallylethylenediamine, divinylbenzene, diallyl phthalate, polyethylene glycol divinyl ethers of polyethylene glycols with a molecular weight $M_w$ of from 126 to 4000, trimethylolpropane diallyl ether, butanediol divinyl ether, pentaerythritol triallyl ether and/or divinylethyleneurea. Water-soluble crosslinkers are preferably used, e.g. N,N'-methylenebisacrylamide, polyethylene glycol diacrylates and polyethylene glycol dimethacrylates derived from adducts of 2 to 400 mol of ethylene oxide and 1 mol of a diol or polyol, vinyl ethers of adducts of 2 to 400 mol of ethylene oxide and 1 mol of a diol or polyol, ethylene glycol diacrylate, ethylene glycol dimethacrylate or triacrylates and trimethacrylates of adducts of 6 to 20 mol of ethylene oxide and one mole of glycerol, pentaerythritol triallyl ether and/or divinylurea.

Also suitable as crosslinkers are compounds which contain at least one polymerizable ethylenically unsaturated group and at least one other functional group. The functional group in these crosslinkers must be able to react with the functional groups, essentially the carboxyl groups or sulfo groups, in the monomers (a). Examples of suitable functional groups are hydroxyl, amino, epoxy and aziridino groups.

Also suitable as crosslinkers are those compounds which have at least two functional groups able to react with carboxyl and sulfo groups in the group (a) monomers used. The suitable functional groups have already been mentioned above, ie. hydroxyl, amino, epoxy, isocyanate, ester, amide and aziridino groups. Examples of such crosslinkers are ethylene glycol, diethylene glycol, triethylene glycol, tetraethylene glycol, polyethylene glycol, glycerol, polyglycerol, propylene glycol, polypropylene glycol, block copolymers of ethylene oxide and propylene oxide, sorbitan fatty acid esters, ethoxylated sorbitan fatty acid esters, trimethylolpropane, pentaerythritol, 1,3-butanediol, 1,4-butanediol, polyvinyl alcohol, sorbitol, polyglycidyl ethers such as ethylene glycol diglycidyl ether, polyethylene glycol diglycidyl ether, glycerol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether and polypropylene glycol diglycidyl ether, polyaziridine compounds such as 2,2-bishydroxymethylbutanol tris[3-(1-aziridinyl)propionate], 1,6-hexamethylenediethyleneurea, 4,4'-dimethanebis(phenyl)-N,N'-diethyleneurea, halo epoxy compounds such as epichlorohydrin and α-methylfluorohydrin, polyisocyanates such as 2,4-tolylene diisocyanate and hexamethylene diisocyanate, alkylene carbonates such as 1,3-dioxolan-2-one and 4-methyl-1,3-dioxolan-2-one, polyquaternary amines such as condensates of dimethylamine with epichlorohydrin, homo- and copolymers of diallyldimethylammonium chloride, and homo- and copolymers of dimethylaminoethyl (meth)acrylate, which are, where appropriate, quaternized with, for example, methyl chloride.

Other suitable crosslinkers are polyvalent metal ions able to form ionic crosslinks. Examples of such crosslinkers are magnesium, calcium, barium and aluminum ions. These crosslinkers are added, for example, as hydroxides, carbonates or bicarbonates to the aqueous polymerizable solution. A particularly preferred crosslinker of this type is sodium aluminate.

Other suitable crosslinkers are multifunctional bases which are likewise able to form ionic crosslinks, for example polyamines or their quaternized salts. Examples of polyamines are ethylenediamine, diethylenetriamine, triethylenetetramine, tetraethylenepentamine, pentaethylenehexamine.

In an embodiment of the process, two different crosslinkers are used, one of which is soluble in water and the other is insoluble in water. The hydrophilic crosslinker which is soluble in the aqueous phase of the reaction mixture produces, in a conventional way, a relatively uniform crosslinking of the resulting polymer, as is conventional in the production of a superabsorbent. The hydrophobic crosslinker which is insoluble or has only limited solubility in the polymerizable aqueous mixture concentrates in the surfactant interlayer between the gas phase and the polymerizable aqueous phase. This means that, in the subsequent polymerization, the surface of the foam is more extensively crosslinked than is the interior of the superabsorbent hydrogel. This results in a core/shell structure of the foam directly in the production of the superabsorbent foam. Such extensive surface crosslinking of a superabsorbent foam is possible in the prior art production processes only by subsequent surface crosslinking of an expanded superabsorbent which has already been formed. In the conventional procedure, a separate process step is necessary for this subsequent crosslinking, but this can be omitted in the process of the present invention or additionally be carried out.

The group (a) monomers are present in the polymerizable aqueous mixture in amounts of, for example, from 10 to 90%, and preferably 20 to 85% by weight. The group (b) monomers are used only where appropriate for modifying the superabsorbent foams and can be present in amounts of up to 50%, preferably in amounts of up to 20% by weight in the polymerizable aqueous mixture. The crosslinkers (c) are present in the reaction mixture in amounts of, for example, from 0.001 to 12%, and preferably from 0.01 to 8% by weight.

The polymerization initiators which can be used are all initiators which form free radicals under the polymerization conditions and which are normally used in the preparation of superabsorbents. It is also possible to initiate the polymerization by the action of electron beams on the polymerizable aqueous mixture. However, the polymerization can also be started in the absence of initiators of the abovementioned type by the action of high-energy radiation in the presence of photoinitiators.

The polymerizable aqueous mixtures contain as component (e) from 0.1 to 20% by weight of at least one surfactant. The surfactants are of crucial importance for the production and stabilization of the foam. Anionic, cationic or nonionic surfactants or mixtures of surfactants which are compatible with one another can be used. It is possible to employ low molecular weight or else polymeric surfactants, and combinations of different or else similar types of surfactants have proved to be advantageous. Examples of nonionic surfactants are adducts of alkylene oxides, in particular ethylene oxide, propylene oxide and/or butylene oxide, and alcohols, amines, phenols, naphthols or carboxylic acids. Surfactants advantageously used are adducts of ethylene oxide and/or propylene oxide and alcohols containing at least 10 carbon atoms, where the adducts contain from 3 to 200 mol of ethylene oxide and/or propylene oxide per mole of alcohol. The adducts contain the alkylene oxide units in the form of blocks or in random distribution. Examples of nonionic surfactants are the adducts of 7 mol of ethylene oxide and 1 mol of tallow fatty alcohol, products of the reaction of 9 mol of ethylene oxide with 1 mol of tallow fatty alcohol and adducts of 80 mol of ethylene oxide and 1 mol of tallow fatty alcohol. Other commercial nonionic surfactants consist of products of the reaction of oxo alcohols or Ziegler alcohols with 5 to 12 mol of ethylene oxide per mole of alcohol, in particular with 7 mol of ethylene oxide. Other commercial nonionic surfactants are obtained by ethoxylation of castor oil. For example, from 12 to 80 mol of ethylene oxide are added on per mole of castor oil. Further commercial products are, for example, the products of the reaction of 18 mol of ethylene oxide with 1 mol of tallow fatty alcohol, the adducts of 10 mol of ethylene oxide and 1 mol of a $C_{13}/C_{15}$ oxo alcohol, or the products of the reaction of 7 to 8 mol of ethylene oxide and 1 mol of a $C_{13}/C_{15}$ oxo alcohol. Other suitable nonionic surfactants are phenol alkoxylates such as p-tert-butylphenol which has been reacted with 9 mol of ethylene oxide, or methyl ethers of products of the reaction of 1 mol of a $C_{12}$–$C_{18}$-alcohol and 7.5 mol of ethylene oxide.

The nonionic surfactants described above can be converted, for example, by esterification with sulfuric acid into the corresponding sulfuric acid half esters. The sulfuric acid half esters are employed as anionic surfactants in the form of the alkali metal or ammonium salts. Examples of suitable anionic surfactants are alkali metal or ammonium salts of sulfuric acid half esters of adducts of ethylene oxide and/or propylene oxide and fatty alcohols, alkali metal or ammonium salts of alkylbenzenesulfonic acid or of alkylphenol ether sulfates. Products of said type are commercially available. Examples of commercial anionic surfactants are the sodium salt of a sulfuric acid half ester of a $C_{13}/C_{15}$ oxo alcohol which has been reacted with 106 mol of ethylene oxide, the triethanolamine salt of dodecylbenzenesulfonic acid, the sodium salt of alkylphenol ether sulfates and the sodium salt of the sulfuric acid half ester of a product of the reaction of 106 mol of ethylene oxide with 1 mol of tallow fatty alcohol. Other suitable anionic surfactants are sulfuric acid half esters of $C_{13}/C_{15}$ oxo alcohols, paraffinsulfonic acids such as $C_{15}$-alkylsulfonate, alkyl-substituted benzenesulfonic acids and alkyl-substituted naphthalenesulfonic acids such as dodecylbenzenesulfonic acid and di-n-butyl-naphthalenesulfonic acid, and fatty alcohol phosphates such as $C_{15}/C_{18}$ fatty alcohol phosphate. The polymerizable aqueous mixture may contain combinations of a nonionic surfactant and an anionic surfactant or combinations of nonionic surfactants or combinations of anionic surfactants. Cationic surfactants are also suitable. Examples thereof are the products, quaternized with dimethyl sulfate, of the reaction of 6.5 mol of ethylene oxide with 1 mol of oleylamine, distearyldimethylammonium chloride, lauryltrimethylammonium chloride, cetylpyridinium bromide and the triethanolamine ester of stearic acid which is quaternized with dimethyl sulfate and is preferably used as cationic surfactant.

The surfactant content of the polymerizable aqueous mixture is preferably 0.5 to 10% by weight. In most cases, the polymerizable aqueous mixtures have a surfactant content of from 1.5 to 8% by weight.

The polymerizable aqueous mixtures may contain as component (f), where appropriate, at least one solubilizer at up to 50% by weight, preferably from 1 to 25% by weight. By this are meant water-miscible organic solvents, e.g. alcohols, glycols, polyethylene glycols and monoethers derived therefrom, the monoethers containing no double bonds in the molecule. Suitable ethers are methylglycol, butylglycol, butyldiglcyol, methyldiglycol, butyltriglycol, 3-ethoxy-1-propanol and glycerol monomethyl ether.

The polymerizable aqueous mixture may also contain thickeners, foam stabilizers, polymerization regulators, fillers and cell nucleators, if desired.

In order to vary the properties of the superabsorbents, for example the absorption speed and the absorption capacity for water, it may be advantageous to add a polymerization regulator or a mixture of several polymerization regulators to the aqueous reaction mixture. Examples of suitable polymerization regulators are formic acid, thio compounds such as 2-mercaptoethanol, mercaptopropanol, mercaptobutanol, dodecyl mercaptan, thioglycolic acid or amines such as triethylamine, morpholine or piperidine. The amounts of polymerization regulators can be up to 10% of the weight of the monomers used. If polymerization regulators are used, preferably from 0.1 to 5% of the weight of the monomers is used.

The constituents indicated under (g) which are to be used optionally, can be employed singly or in a mixture in the production of the polymers according to the invention. However, the absence of thickeners, foam stabilizers, fillers, cell nucleators and polymerization regulators is also possible.

Water-absorbent crosslinked polymer foams are produced by the above-described polymerizable aqueous mixture being foamed in a first stage and polymerized in the second stage. The polymerization is preferably effected by heating the foamed mixture with microwaves.

The formed foam articles can be produced, for example, as sheets, blocks or webs up to 2 m in height or as films a few mm in thickness, for example from 0.5 to 7 mm. The preferred foam height (in the foam rise direction) is in the range from 10 cm to 100 cm for 2.45 GHz microwaves. All desired sheet or fleece thicknesses can be cut out of such foam blocks.

Preference is given to foam articles having an open-celled structure, particularly preferably with an open-cell content of >90%.

To improve the wet strength of the foams described above and to reduce their residual monomer content, they are treated in a further step with at least one polymer which contains primary and/or secondary amino groups and has a molar mass $M_w$ of at least 300. The treatment of the foam can be carried out by having hot air flow through the foam and adding polymers containing primary and/or secondary amino groups to the air, for example in the form of an aerosol.

The polymeric treatment agents are normally used in dissolved form by dissolving them in a solvent. They can also be applied to the foams in the form of aqueous dispersions or dispersions in an organic solvent. The treatment can be effected for example by dipping a foam article into the liquid which contains at least one polymer containing primary and/or secondary amino groups in dissolved or in dispersed form. Alternatively the liquid with the dissolved or dispersed polymeric treatment agent can also be applied to the foam surface by spraying. The solvent is then removed from the thus treated foam article, for example by drying the foam.

Any treatment of the surface of the foams can also be effected by applying crosslinked polymers or a crosslinked sheath, for example by first applying polymers containing primary and/or secondary amino groups to the surface of the foams, then adding a crosslinker and allowing it to react with the functional groups of the polymers. Useful crosslinkers include all compounds bearing at least two amine-reactive groups, for example acid functions, epoxides, aldehydes, ketones, esters, acrylates, methacrylates, aziridines, vinyl sulfones.

Application techniques include initially spraying and dipping. But the foam can also be saturated with the solution by means of rolls or film castors. Preferred application techniques are spraying and saturating.

Useful solvents include in principle all solvents in which the polymers are soluble. The preferred solvents used are water and mixtures of water with water-soluble solvents such as for example methanol, ethanol, n-propanol, isopropanol, acetone and/or methyl ethyl ketone. The solvent-water mixture is ideally chosen so that the superabsorbent foam swells only minimally in this solvent mixture.

The primary and/or secondary amino groups containing polymer can be applied, after the polymerization has taken place, at any stage of the production process of the foam, preferably prior to the drying step. The solvent and water can then be removed simultaneously from the reaction mixture. But it is also conceivable first to dry the foam and to coat it in a subsequent step. The solvent must thereafter be removed from the foam article thus treated, for example by renewed drying of the foam. The coated foam is dried for example at from 40 to 160° C., preferably at up to 110° C. under atmospheric or under reduced pressure, for example from 5 to 300 mbar, preferably from 10 to 70 mbar, at from 60 to 110° C.

The amount of polymeric treatment agent added is determined so that the residual monomer content of the article formed from water absorbent crosslinked polymer foams containing units derived from monoethylenically unsaturated acids is reduced and the wet strength is enhanced. The polymeric treatment agent is preferably added in such an amount that the resulting amount of polymer is at least 0.5% by weight. Amounts of up to 80% by weight of amino-containing polymer, based on foam, are possible. Preference is given to using from 0.5 to 40% by weight and especially from 1 to 20% by weight, based on the foam, of polymeric treatment agent.

Useful polymeric treatment agents include cationic synthetic polymers containing primary and/or secondary amino and/or ammonium groups. Examples of such cationic polymers are uncrosslinked vinylamine polymers, crosslinked vinylamine polymers, polyethyleneimines, alkoxylated polyethyleneimines, crosslinked polyethyleneimines, amidated polyethyleneimines, alkylated polyethyleneimines, uncrosslinked polyvinyl guanidines, crosslinked polyvinylguanidines, alkoxylated polyvinylamines, polyallylamines and/or condensates of lysine, ornithine or arginine or else polymers of natural origin, for example chitosan.

Vinylamine polymers (i.e., polymers containing vinylamine units) are preparable for example from open-chain N-vinylcarboxamides of the formula (I)

where $R^1$ and $R^2$ are identical or different and are each hydrogen or $C_1$- to $C_6$-alkyl. Useful monomers include for example N-vinylformamide ($R^1=R^2=H$ in formula I), N-vinyl-N-methylformamide, N-vinylacetamide, N-vinyl-N-methylacetamide, N-vinyl-N-ethylacetamide, N-vinyl-N-methylpropionamide and N-vinylpropionamide. To prepare the polymers, the monomers mentioned may be polymerized alone, mixed with each other or together with other monoethylenically unsaturated monomers. Homo- and copolymers of N-vinylformamide are preferred as starting material. Vinylamine polymers are known for example from U.S. Pat. No. 4,421,602, U.S. Pat. No. 5,334,287, EP-A-0 216 387 and EP-A-0 251 182. They are obtained by acid, base or enzymatic hydrolysis of polymers containing units derived from monomers of formula I.

Useful monoethylenically unsaturated monomers for copolymerization with N-vinylcarboxamides include all compounds copolymerizable therewith. Examples thereof are vinyl esters of saturated carboxylic acids of from 1 to 6 carbon atoms such as vinyl formate, vinyl acetate, vinyl propionate and vinyl butyrate and vinyl ethers such as $C_1$- to $C_6$-alkyl vinyl ethers, e.g., methyl or ethyl vinyl ether. Useful comonomers further include ethylenically unsaturated $C_3$- to $C_6$-carboxylic acids, for example acrylic acid, methacrylic acid, maleic acid, crotonic acid, itaconic acid and vinylacetic acid and also their alkali metal and alkaline earth metal salts, esters, amides and nitriles of the carboxylic acids mentioned, for example methyl acrylate, methyl methacrylate, ethyl acrylate and ethyl methacrylate.

Further useful carboxylic esters are derived from glycols or polyalkylene glycols where in each case only one OH group is esterified, for example hydroxyethyl acrylate, hydroxyethyl methacrylate, hydroxypropyl acrylate, hydroxybutyl acrylate, hydroxypropyl methacrylate, hydroxybutyl methacrylate and also monoacrylate esters of polyalkylene glycols having a molar mass of from 500 to 10 000. Useful comonomers further include esters of ethylenically unsaturated carboxylic acids with aminoalcohols, for example dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, dimethylaminobutyl acrylate and diethylaminobutyl acrylate. Basic acrylates can be used in the form of the free bases, the salts with mineral acids such as hydrochloric acid, sulfuric acid or nitric acid, the salts with organic acids such as formic acid, acetic acid, propionic acid or sulfonic acids or in quaternized form. Useful quaternizing agents include for example dimethyl sulfate, diethyl sulfate, methyl chloride, ethyl chloride or benzyl chloride.

Useful comonomers further include amides of ethylenically unsaturated carboxylic acids such as acrylamide, methacrylamide and also N-alkylmonoamides and diamides of monoethylenically unsaturated carboxylic acids with alkyl radicals of from 1 to 6 carbon atoms, for example N-methylacrylamide, N,N-dimethylacrylamide, N-methylmethacrylamide, N-ethylacrylamide and N-propylacrylamide and tert-butylacrylamide and also basic (meth) acrylamides, for example dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Useful comonomers further include N-vinylpyrrolidone, N-vinylcaprolactam, acrylonitrile, methacrylonitrile, N-vinylimidazole and also substituted N-vinylimidazoles, for example N-vinyl-2-methylimidazole, N-vinyl-4-methylimidazole, N-vinyl-5-methylimidazole, N-vinyl-2-ethylimidazole and N-vinylimidazolines such as N-vinylimidazoline, N-vinyl-2-methylimidazoline and N-vinyl-2-ethylimidazoline. N-Vinylimidazoles and N-vinylimidazolines are used not only in the form of the free bases but also after neutralization with mineral acids or organic acids or after quaternization, a quaternization being preferably effected with dimethyl sulfate, diethyl sulfate, methyl chloride or benzyl chloride. Also useful are diallyldialkylammonium halides, for example diallyldimethylammonium chlorides.

Useful comonomers further include sulfo-containing monomers, for example vinylsulfonic acid, allylsulfonic acid, methallylsulfonic acid, styrenesulfonic acid, the alkali metal or ammonium salts of these acids or 3-sulfopropyl acrylate. Since the amphoteric copolymers contain more cationic units than anionic units, they have a cationic charge overall.

The copolymers contain for example from 99.99 to 1 mol %, preferably from 99.9 to 5 mol %, of N-vinylcarboxamides of the formula I and from 0.01 to 99 mol %, preferably from 0.1 to 95 mol %, of other monoethylenically unsaturated monomers copolymerizable therewith in copolymerized form.

Crosslinked vinylamine polymers may be prepared by polymerizing N-vinylcarboxamides such as N-vinylformamide, in the presence of at least one group of monomers which contain at least two mono-ethylenically unsaturated double bonds and subsequent hydrolysis of the crosslinked polymers. Suitable crosslinkers which contain at least two monoethylenically unsaturated double bonds are, for example, N,N'-methylenebisacrylamide, ethylene glycol diacrylate, ethylene glycol dimethacrylate, propylene glycol diacrylate, butylene glycol diacrylate, allyl methacrylate, diacrylates and dimethacrylates from polyethylene glycols having a molar mass Mw of from 106 to 8,500, divinyl ethers of polyalkylene glycols having a molar mass Mw of from 126 to 4,000, divinyl ethylene urea and divinyl ether of butanediol. The crosslinkers are used, for example, in an amount of from 0 to 10% by weight, preferably 0.01 to 5.0 and especially 0.05 to 2% by weight, with reference to the monomers which are polymerized.

The polymerization of N-vinylcarboxamides with the monomers which contain at least two monoethylenically unsaturated double bonds can also be carried in the presence of the above-mentioned comonomers such as acrylic esters of monovalent alcohols, vinyl acetate, acrylic acid, methacrylic acid, N-vinylpyrrolidone and styrene.

Crosslinked vinylamine polymers may be additionally obtained by reacting an uncrosslinked vinylamine units containing polymer with a crosslinking agent which has at least two functional groups which react with amino groups, for example, aldehydes such as formaldehyde, glutardialdehyde, epichlorohydrin and multifunctional epoxides.

To prepare vinylamine polymers it is preferable to start from homopolymers of N-vinylformamide or from copolymers obtainable by copolymerization of
N-vinylformamide with
vinyl formate, vinyl acetate, vinyl propionate, acrylonitrile, N-vinylcaprolactam, N-vinylurea, acrylic acid, N-vinylpyrrolidone or $C_1$- to $C_6$-alkyl vinyl ethers and subsequent hydrolysis of the homo- or copolymers to form vinylamine units from the copolymerized N-vinylformamide units, the degree of hydrolysis being for example in the range from 0.1 to 100 mol %.

The hydrolysis of the above-described polymers is effected according to known processes by the action of acids, bases or enzymes. This converts the copolymerized monomers of the above-indicated formula I through detachment of the group where $R^2$ is as defined for formula I, into polymers which contain vinylamine units of the formula where $R^1$ is as defined for formula I. When acids are used as hydrolyzing agents, the units III are present as ammonium salt.

The homopolymers of the N-vinylcarboxamides of the formula I and their uncrosslinked or crosslinked copolymers may be hydrolyzed to an extent in the range from 0.1 to 100 mol %, preferably to an extent in the range from 70 to 100 mol %. In most cases, the degree of hydrolysis of the homo- and copolymers is in the range from 5 to 95 mol %. The degree of hydrolysis of the homopolymers is synonymous with the vinylamine units content of the polymers. In the case of copolymers containing units derived from vinyl esters, the hydrolysis of the N-vinylformamide units can be accompanied by a hydrolysis of the ester groups with the formation of vinyl alcohol units. This is the case especially when the hydrolysis of the copolymers is carried out in the presence of aqueous sodium hydroxide solution. Copolymerized acrylonitrile is likewise chemically modified in the hydrolysis, for example converted into amide groups or carboxyl groups. The homo- and copolymers containing vinylamine units may optionally contain up to 20 mol % of amidine units, formed for example by reaction of formic acid with two adjacent amino groups or by intramolecular reaction of an amino group with an adjacent amide group, for example of copolymerized N-vinylformamide. The molar masses $M_w$ of vinylamine polymers range for example from 500 to 10 million, preferably from 1000 to 5 million (determined by light scattering). This molar mass range corresponds for example to K values of from 5 to 300, preferably from 10 to 250 (determined by the method of H. Fikentscher in 5% aqueous sodium chloride solution at 25° C. and a polymer concentration of 0.5% by weight).

The vinylamine polymers are preferably used in salt-free form. Salt-free aqueous solutions of vinylamine polymers are preparable for example from the above-described salt-containing polymer solutions by means of ultrafiltration using suitable membranes having molecular weight cutoffs at for example from 1000 to 500,000 daltons, preferably from 10,000 to 300,000 daltons. The hereinbelow described aqueous solutions of other polymers containing amino and/or ammonium groups are likewise obtainable in salt-free form by means of ultrafiltration.

Polyvinyl guanidines can be synthesized from the vinylamine units containing polymers described above, i.e. from hydrolyzed homopolymers of N-vinylcarboxamides of formula I and their copolymers.

In general, an uncrosslinked polyvinyl guanidine is a water-soluble polymer. In the preparation of polyvinyl guanidines, it is desirable that hydrolysis of the polyvinylamides is substantially to essentially complete, i.e., about 10% to 100% complete, and preferably about 30% to 100% complete. To achieve the full advantage of the present invention, at least about 50%, and more preferably at least about 90%, of the amide groups are hydrolyzed to an amine functionality. The amine-functional polymer can contain other copolymerizable units, i.e., other monoethylenically unsaturated monomers, as long as the polymer is substantially, i.e., at least 10%, and preferably at least 25%, vinylamine units. To achieve the full advantage of the present invention, the polymer contains at least 50%, and more preferably at least 75%, vinylamine units.

Polyvinyl guanidines are preferably prepared by reacting a polyvinylamine with a cyanamide having the formula $R^1R^2N$—CN. The cyanamide reacts with the amino groups of the polyvinylamine to provide a polyvinyl guanidine. The $R^1$ and $R^2$ groups can be, for example, hydrogen, $C_1$–$C_4$alkyl, $C_3$–$C_6$cycloalkyl, phenyl, benzyl, alkyl-substituted phenyl, naphthyl, and similar aliphatic and aromatic groups. The alkyl $R^1$ and $R^2$ groups can be straight or branched. They can be substituted or unsubstituted. The polyvinylamine used in the synthesis of a polyvinyl guanidine can be crosslinked or uncrosslinked, and can contain other monomer units in addition to vinylamine units. This method can be used to manufacture either crosslinked or uncrosslinked polyvinyl guanidine.

The above method of manufacturing an uncrosslinked polyvinyl guanidine can also be used in the manufacture of a crosslinked polyvinyl guanidine. Crosslinking serves to render the polyvinyl guanidine polymers substantially water insoluble. For example, a lightly crosslinked polyvinyl guanidine has a crosslinking density of less than about 20%, preferably less than about 10%, and most preferably about 0.01% to about 7%.

When used, a crosslinking agent most preferably is included in an amount of less than about 7 wt %, and typically about 0.1 wt % to about 5 wt %, based on the total weight of monomers. A polyvinyl guanidine can be crosslinked by two different pathways. One pathway utilizes olefinically unsaturated crosslinking monomers that copolymerize with the N-vinylamide, and, therefore, form a part of the polymeric backbone. The crosslinked poly(N-vinylamide) then is hydrolyzed to provide crosslinked poly(vinylamine), which in turn is converted into a crosslinked polyvinyl guanidine.

Polyvinyl guanidine also can be crosslinked in solution by suspending or dissolving uncrosslinked polyvinyl guanidine in an aqueous medium, then adding a di- or polyfunctional compound capable of crosslinking the polyvinyl guanidine by reaction with the guanidino groups of the polymer. The polyvinyl guanidine can be in a free base form or can be in a salt form. Such crosslinking agents include, for example, monofunctional aldehydes (e.g., formaldehyde and acetaldehyde), multifunctional aldehydes (e.g., glutaraldehyde), multifunctional acrylates (e.g., butanediol diacrylate, trimethylol propane triacrylate), halohydrins (e.g., epichlorohydrin), dihalides (e.g., dibromopropane), disulfonate esters (e.g., $RS(O_2)O-(CH_2)_n-OS(O)_2R$, wherein n is one to 10, and R is methyl or tosyl), multifunctional epoxides (e.g., ethylene glycol diglycidyl ether), melamine resins (e.g., CYMEL 301, CYMEL 303, CYMEL 370, and CYMEL 373 from Cytec Industries, Wayne, N.J.), hydroxymethyl ureas (e.g., N,N'dihydroxymethyl-4,5-dihydroxyethyleneurea).

In general, the crosslinking agent should be soluble in water or alcohol and possess sufficient reactivity with a polyvinyl guanidine such that crosslinking occurs in a controlled fashion, preferably at a temperature of about 25° C. to about 150° C. Preferred crosslinking agents are ethylene glycol diglycidyl ether (EGDGE), a water-soluble diglycidyl ether and dihaloalkanes, especially dibromoalkanes.

Uncrosslinked polyvinyl guanidines which are prepared from hydrolyzed homopolymers of N-vinylformamide are preferably used for the reduction of the residual monomer content and the simultaneous increase of the wet strength of the polymer foams.

Polyethyleneimines are prepared for example by polymerizing ethyleneimine in an aqueous solution in the presence of acid-detaching compounds, acids or Lewis acids as catalyst. Polyethyleneimines have for example molar masses $M_w$ of up to 2 million, preferably of from 200 to 1,000,000. Particular preference is given to using polyethyleneimines having molar masses $M_w$ of from 500 to 800,000. Useful polyethyleneimines further include water-soluble crosslinked polyethyleneimines which are obtainable by reaction of polyethyleneimines with crosslinkers such as epichlorohydrin or bischlorohydrin ethers of polyalkylene glycols containing from 2 to 100 ethylene oxide and/or propylene oxide units and still have free primary and/or secondary amino groups. Also useful are amidic polyethyleneimines which are obtainable for example by amidation of polyethyleneimines with $C_1$- to $C_{22}$-monocarboxylic acids. Useful cationic polymers further include alkylated polyethyleneimines and alkoxylated polyethyleneimines. Alkoxylation is carried out using for example from 1 to 5 ethylene oxide or propylene oxide units per NH unit in the polyethyleneimine.

Useful polymers having primary and/or secondary amino and/or ammonium groups also include polyallylamines. Polymers of this kind are obtained by homopolymerization of allylamine, preferably in acid-neutralized form, or by copolymerizing allylamine with other monoethylenically unsaturated monomers described above as comonomers for N-vinylcarboxamides.

The cationic polymers have for example K values of from 8 to 300, preferably from 15 to 180 (determined by the method of H. Fikentscher in 5% aqueous sodium chloride solution at 25% and a polymer concentration of 0.5% by weight). At pH 4.5, for example, they have a charge density of at least 1, preferably at least 4, meq/g of polyelectrolyte.

Preferred cationic polymers are polyethyleneimine, polymers containing vinylamine units, polyvinyl guanidines, polymers containing lysine units or mixtures thereof. Examples of preferred cationic polymers are:

polylysines of $M_w$ 250–250,000, preferably 500–100,000, and also lysine condensates having molar masses $M_w$ of from 250 to 250,000, the cocondensable component being selected for example from amines, polyamines, ketene dimers, lactams, alcohols, alkoxylated amines, alkoxylated alcohols and/or nonproteinogenic amino acids, vinylamine homopolymers, 1–99% hydrolyzed polyvinylformamides, copolymers of vinylformamide and vinyl acetate, vinyl alcohol, vinylpyrrolidone or acrylamide, each having molar masses $M_w$ of 3000–2,000,000, and polyethyleneimines, crosslinked polyethyleneimines or amidated polyethyleneimines having molar masses $M_w$ of from 500 to 3,000,000.

The process of the invention provides for a dramatic reduction in the residual monomer content in the foam in terms of, for example, monoethylenically unsaturated acids such as acrylic acid and at the same time a substantial enhancement of the wet strength of foam articles formed from such water-absorbent crosslinked polymer foams.

The invention therefore also provides articles formed from water-absorbent crosslinked polymer foams containing units derived from monoethylenically unsaturated acids that are obtainable by the processes described above.

The hygiene articles are preferably infant diapers, incontinence products, femcare articles, wound contact materials or secondary wound dressings.

Characterization of Water-Absorbent Foams:

The density of superabsorbent foams was determined gravimetrically. Squares having an edge length of 5 cm are cut, for example with a sharp knife, out of a uniform foam layer having a defined thickness in the range from 3 to 5 mm. These square samples are weighed, and the weight obtained is divided by the volume calculated from the dimensions.

Determination of Absorption Capacity:

The absorption capacity of the superabsorbent foam in terms of water per gram of superabsorbent is determined on pieces of the foam, which are 3 mm in thickness and each weigh 1 g. The absorption capacity is tested by the teabag test. The liquid used is a 0.9% sodium chloride solution. 1 g of the foam material is introduced into a teabag, which is then sealed. Here it is important to ensure that the teabag offers sufficient room for complete swelling. The teabag is then immersed in the liquid for a certain period, for example 30 min, and reweighed after a dripping period of, for example, 10 minutes. The blank is determined by immersing a teabag without superabsorbent foam in the solution and determining the weight of the teabag under the conditions described above. The absorption capacity is then calculated from the following equation (1):

$$\text{absorption capacity} \frac{G_{TS} - G_T}{G_S}$$

where $G_{TS}$ is the weight of the teabag with the swollen superabsorbent foam $G_T$ is the weight of the teabag in the blank test $G_S$ is the weight of the superabsorbent foam sample

Determination of Absorption Rate:

The free absorption rate (hereinafter referred to as FAR) is found by cutting out, using a sharp knife, rectangular samples weighing 1 g from foam layers having a uniform thickness of 3 mm. These samples are placed in a Petri dish and 20 g of 0.9% sodium chloride solution are poured over. A stopwatch is used to determine the time required by the foam sample to completely absorb the 0.9% sodium chloride solution. The absorption rate FAR in g/g·sec is calculated from the following equation (2):

$$FAR = 20 \text{ g}/[1 \text{ g·measured time in sec}] \quad (2)$$

Evaluation of Wet Strength:

A foam sample 1 g in weight and 3 mm in layer thickness in a Petri dish has 20 ml of 0.9% sodium chloride solution applied to it and is allowed to swell for 30 min. The stability-with regard to bending and compressing stress is then evaluated on a 4-step scale (the higher the numerical value, the better). Each evaluation is based on a new, swollen foam sample.

Compressive Stress:

The foam in the Petri dish is compressed with the thumb as far as possible and allowed to recover again. The number of times the operation can be repeated until the foam disintegrates is noted.

| Number of cycles | Rating |
|---|---|
| <2 | 1 |
| 2–4 | 2 |
| 5–8 | 3 |
| >8 | 4 |

Bending Stress:

The foam sample is removed from the dish and folded into a 180° angle.

1 means: Foam breaks on removal from the Petri dish 2 means: Foam breaks at a bending angle of less than 90°

3 means: Foam breaks at a bending angle in the range from 90 to 180°

4 means: Foam remains intact even when bent to 180°

Figure 1:
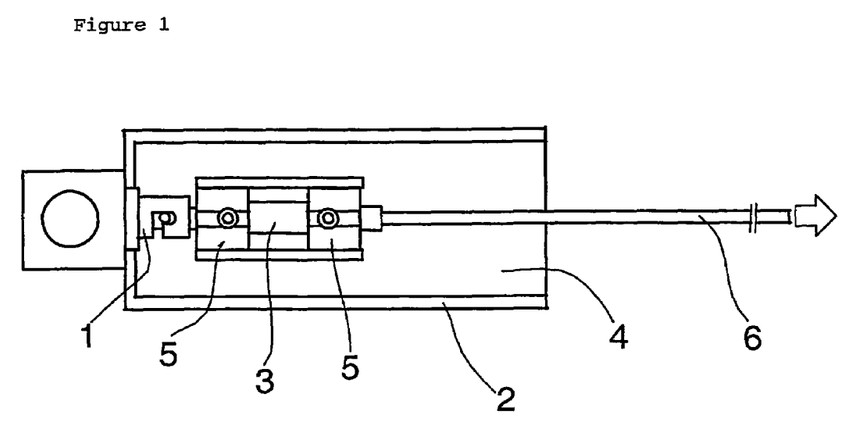

Measurement of Tensile Strength:

The tensile strength is measured as per the drawing on foam samples (3) completely swollen in 0.9% sodium chloride solution (4). For this, the sample holder (1) of a conventional tensile tester was modified with a Plexiglas container (2) as per the accompanying drawing. The foam sample (3) is secured in holding clamps (5). The drawbar (6) is used to apply mechanical stress to the foam sample.

The Measurement is then Carried Out as Follows:

First a dumbbell specimen conforming to DIN 53448/A is stamped out of a foam layer 3 mm in thickness and placed in the holder of the tensile tester. The Plexiglas vessel is then filled with 0.9% sodium chloride solution and the foam is allowed to swell for 10 minutes. The increased length due to the swelling is compensated, so that the swollen specimen is again in a completely stretched state. A stress-strain diagram is then recorded at an extension rate of 6 mm/min and used to determine the breaking extension and tensile strength in the usual way. Each foam sample is subjected to 8 measurements.

Equipment Used:

Type Z 050 or UPM 1465 tensile tester from Zwick combined with a 1 kN force transducer of type KAP-S from A.S.T GmbH or with a 50 N force transducer of type U1 from Hottinger Baldwin Messtechnik.

Determination of Residual Acrylic Acid Content:

The foam to be analyzed is dried at 85° C. under reduced pressure overnight and ground. 250 mg of this sample are weighed into a 50 ml volumetric flask, admixed with 40 ml of 0.9% sodium chloride solution and stirred for 30 min. After addition of 250 µl of conc. phosphoric acid, the volumetric flask is made up to 50 ml with 0.9% sodium chloride solution and stirred for a further 30 min. This is followed by filtering through a 0.45 µm membrane filter.

The acrylic acid concentration is determined by HPLC against an external standard. The columns used are a Shimazu IEG precolumn and a Shimpack IE 300×8 P/N 480–07 for separation. The mobile phase used is a solution of 7.5 ml of 85% orthophosphoric acid in 5 l of bidistilled water. Detection is by a UV detector at a wavelength of 210 nm.

Unless the context suggests otherwise, percentages are always by weight. The K values of the polymers were determined by the method of H. Fikentscher, Cellulose-Chemie, Volume 13, 58 to 64 and 71–74 (1932) in 0.5% aqueous sodium chloride solution at 25° C. and a polymer concentration of 1% by weight.

EXAMPLES

Comparative Example 1 repeat of Example 10 of WO-A-99/44648

The following components were mixed in a jar closed with a screw cap using a magnetic stirrer:

127.93 g of acrylic acid (1.77 mol)

93.43 g of a 37.3% sodium acrylate solution in water (0.37 mol)

12.60 g of guar bean flour 6.29 g of polyethylene glycol diacrylate of a polyethylene glycol of molar mass 400

58.78 g of a 15% aqueous solution of an addition product of 80 mol of ethylene oxide and 1 mol of a linear saturated $C_{16}$–$C_{18}$ fatty alcohol 63.02 g of water The homogeneous mixture obtained was introduced into a sealed 2 l flask which was equipped with a cooling jacket and a dropping funnel and into which carbon dioxide was passed from below. Two BOKU egg whisks connected via gears to an IKA RW28W stirrer had been inserted into the flask. The carbon dioxide stream was adjusted so that it bubbled at a rate of 100 l/h through the reaction mixture. The stirrer motor was initially adjusted to a speed of 200 rpm, and carbon dioxide was passed through the mixture for 20 min to remove dissolved oxygen. During this time, 152.42 g of triethanolamine (1.02 mol) were added dropwise with cooling at such a rate that a final temperature of 16° C. was attained.

Subsequently, 4.63 g of pentane and 20.99 g of a 3% solution of 2,2'-azobis(2-amidinopropane) dihydrochloride in water were added, and the stirrer speed was increased to 735 rpm. The mixture was beaten at this speed for 3.5 min. At the end of the beating period, a finely cellular, free-flowing foam was obtained.

The monomer foam obtained was placed in a DIN-A3-sized glass plate having edges 3 mm in height and covered with a second glass plate. The foam sample was irradiated synchronously from both sides with two VIS UV lamps (UV 1000 from Höhnle) for 4 minutes.

The foam layer obtained was dusted on both sides with about 0.3 g of talc and completely dried in a vacuum drying cabinet at 70° C. To determine the properties, part of the foam was subsequently adjusted to a mosture content of 10% by spraying with water.

| Residual acrylic acid content: | 2,900 ppm |
| --- | --- |
| Polymer foam density: | 0.23 g/cm$^3$ |
| Absorption capacity: | 55.9 g/g |
| FAR: | 3.25 g/g sec |

Comparative Example 2 repeat of Example 2 of WO-A-00/52087

The following components were mixed in a beaker using a magnetic stirrer:
303.24 g of acrylic acid (4.21 mol)
117.90 g of a 37.3% sodium acrylate solution in water (0.47 mol)
24.36 g of polyethylene glycol diacrylate of polyethylene glycol of molar mass 500
5.57 g of an addition product of 80 mol of ethylene oxide and 1 mol of a linear saturated $C_{16}$–$C_{18}$-fatty alcohol
0.15 g of water To this solution were added, while cooling in ice, 348.79 g (2.69 mol) of triethanolamine in such a way that the internal temperature did not exceed 16° C. The solution obtained was transferred into a pressure vessel and saturated therein with carbon dioxide under a pressure of 12 bar for 25 min. Under pressure, 13.92 g of a 3% aqueous solution of 2,2'-azobis(2-amidinopropane)dihydrochloride were added and mixed in using a fast stream of carbon dioxide until homogeneous. Carbon dioxide was then passed through the reaction mixture for a further 5 min. The saturated reaction mixture was forced under a pressure of 12 bar through a nozzle having a diameter of 1 mm to form a finely cellular free-flowing foam.

The monomer foam obtained was placed in a DIN-A3-sized glass plate having edges 3 mm in height and covered with a second glass plate. The foam sample was irradiated synchronously from both sides with two VIS UV lamps (UV 1000 from Höhnle) for 4 minutes.

The foam layer obtained was dusted on both sides with about 0.3 g of talc and completely dried in a vacuum drying cabinet at 70° C. To determine the properties, part of the foam was subsequently adjusted to a mosture content of 10% by spraying with water.

| Residual acrylic acid content: | 4,500 ppm |
| --- | --- |
| Polymer foam density: | 0.17 g/cm$^3$ |
| Absorption capacity: | 57.9 g/g |
| FAR: | 6.67 g/g sec |

Example 1

The following components were mixed in a beaker using a magnetic stirrer:
209.13 g of acrylic acid (2.90 mol)
81.31 g of a 37.3% sodium acrylate solution in water (0.32 mol)
9.60 g of polyethylene glycol diacrylate of polyethylene glycol of molar mass 400
25.60 g of a 15% aqueous solution of an addition product of 80 mol of ethylene oxide and 1 mol of a linear saturated $C_{16}$–$C_{18}$-fatty alcohol
26.62 g of water To this solution were added, while cooling in ice, 240.54 g (1.61 mol) of triethanolamine in such a way that the internal temperature did not exceed 16° C. The solution obtained was transferred into a pressure vessel and saturated therein with carbon dioxide under a pressure of 12 bar for 25 min. Under pressure, 16.00 g of a 3% aqueous solution of 2,2'-azobis(2-amidinopropane)dihydrochloride were added and mixed in using a fast stream of carbon dioxide until homogeneous. Carbon dioxide was then passed through the reaction mixture for a further 5 min. The saturated reaction mixture was forced under a pressure of 12 bar through a nozzle having a diameter of 1 mm to form a finely cellular free-flowing foam.

The monomer foam obtained was placed in a DIN-A3-sized glass plate having edges 3 mm in height and covered with a second glass plate. The foam sample was irradiated synchronously from both sides with two VIS UV lamps (UV 1000 from Höhnle) for 4 minutes.

The foam layer obtained was dusted on both sides with about 0.3 g of talc and completely dried in a vacuum drying cabinet at 75° C.

The foam obtained was uniformly impregnated with a 3% solution of polyethyleneimine (molecular weight $M_w$ 750,000) in a 1:2 w/w water/isopropanol mixture so that the applied amount of polyethyleneimine amounted to 5%. The foam was redried in a vacuum drying cabinet at 75° C. and then adjusted to a moisture content of 10% by spraying with water.

| Residual acrylic acid content: | 200 ppm |
| --- | --- |
| Polymer foam density: | 0.22 g/cm$^3$ |
| Absorption capacity: | 48.3 g/g |
| FAR: | 5.0 g/g sec |

Example 2

The following components were mixed in a beaker using a magnetic stirrer:
209.13 g of acrylic acid (2.90 mol)
81.31 g of a 37.3% sodium acrylate solution in water (0.32 mol)
4.80 g of polyethylene glycol diacrylate of polyethylene glycol of molar mass 400
25.60 g of a 15% aqueous solution of an addition product of 80 mol of ethylene oxide and 1 mol of a linear saturated $C_{16}$–$C_{18}$-fatty alcohol
26.62 g of water To this solution were added, while cooling in ice, 240.54 g (1.61 mol) of triethanolamine in such a way that the internal temperature did not exceed 16° C. The solution obtained was transferred into a pressure vessel and saturated therein with carbon dioxide under a pressure of 12 bar for 25 min. Under pressure, 16.00 g of a 3% aqueous solution of 2,2'-azobis(2-amidinopropane)dihydrochloride were added and mixed in using a fast stream of carbon dioxide until homogeneous. Carbon dioxide was then passed through the reaction mixture for a further 5 min. The saturated reaction mixture was forced under a pressure of 12 bar through a nozzle having a diameter of 1 mm to form a finely cellular free-flowing foam.

The monomer foam obtained was placed in a DIN-A3-sized glass plate having edges 3 mm in height and covered with a second glass plate. The foam sample was irradiated synchronously from both sides with two VIS UV lamps (UV 1000 from Höhnle) for 4 minutes.

The foam layer obtained was dusted on both sides with about 0.3 g of talc and completely dried in a vacuum drying cabinet at 75° C.

The foam obtained was uniformly impregnated with a 3% solution of polyethyleneimine (molecular weight $M_w$ 750,000) in a 1:2 water/isopropanol mixture so that the applied amount of polyethyleneimine amounted to 10%. The foam was redried in a vacuum drying cabinet at 75° C. and then adjusted to a moisture content of 10% by spraying with water.

| | |
|---|---|
| Residual acrylic acid content: | 80 ppm |
| Polymer foam density: | 0.26 g/cm³ |
| Absorption capacity: | 45.3 g/g |
| FAR: | 5.0 g/g sec |

Example 3

The following components were mixed in a beaker using a magnetic stirrer:

209.13 g of acrylic acid (2.90 mol)

81.31 g of a 37.3% sodium acrylate solution in water (0.32 mol)

9.60 g of polyethylene glycol diacrylate of polyethylene glycol of molar mass 400

25.60 g of a 15% aqueous solution of an addition product of 80 mol of ethylene oxide and 1 mol of a linear saturated $C_{16}$–$C_{18}$-fatty alcohol 26.62 g of water To this solution were added, while cooling in ice, 240.54 g (1.61 mol) of triethanolamine in such a way that the internal temperature did not exceed 16° C. The solution obtained was transferred into a pressure vessel and saturated therein with carbon dioxide under a pressure of 12 bar for 25 min. Under pressure, 16.00 g of a 3% aqueous solution of 2,2'-azobis(2-amidinopropane)dihydrochloride were added and mixed in using a fast stream of carbon dioxide until homogeneous. Carbon dioxide was then passed through the reaction mixture for a further 5 min. The saturated reaction mixture was forced under a pressure of 12 bar through a nozzle having a diameter of 1 mm to form a finely cellular free-flowing foam.

The monomer foam obtained was placed in a DIN-A3-sized glass plate having edges 3 mm in height and covered with a second glass plate. The foam sample was irradiated synchronously from both sides with two VIS UV lamps (UV 1000 from Höhnle) for 4 minutes.

The foam layer obtained was dusted on both sides with about 0.3 g of talc and completely dried in a vacuum drying cabinet at 75° C.

The foam obtained was uniformly sprayed with a 2% solution of polyvinylamine (K value 90) in a 7:3 w/w water/ethanol mixture so that the applied amount of polyvinylamine amounted to 4%. The foam was redried in a vacuum drying cabinet at 75° C. and then adjusted to a moisture content of 10% by spraying with water.

| | |
|---|---|
| Residual acrylic acid content: | 300 ppm |
| Polymer foam density: | 0.21 g/cm³ |
| Absorption capacity: | 47.3 g/g |
| FAR: | 4.8 g/g sec |

Example 4

The following components were mixed in a beaker using a magnetic stirrer:

209.13 g of acrylic acid (2.90 mol)

81.31 g of a 37.3% sodium acrylate solution in water (0.32 mol)

4.80 g of polyethylene glycol diacrylate of polyethylene glycol of molar mass 400

25.60 g of a 15% aqueous solution of an addition product of 80 mol of ethylene oxide and 1 mol of a linear saturated $C_{16}$–$C_{18}$-fatty alcohol 26.62 g of water To this solution were added, while cooling in ice, 240.54 g (1.61 mol) of triethanolamine in such a way that the internal temperature did not exceed 16° C. The solution obtained was transferred into a pressure vessel and saturated therein with carbon dioxide under a pressure of 12 bar for 25 min. Under pressure, 16.00 g of a 3% aqueous solution of 2,2'-azobis(2-amidinopropane)dihydrochloride were added and mixed in using a fast stream of carbon dioxide until homogeneous. Carbon dioxide was then passed through the reaction mixture for a further 5 min. The saturated reaction mixture was forced under a pressure of 12 bar through a nozzle having a diameter of 1 mm to form a finely cellular free-flowing foam.

The monomer foam obtained was placed in a DIN-A3-sized glass plate having edges 3 mm in height and covered with a second glass plate. The foam sample was irradiated synchronously from both sides with two VIS UV lamps (UV 1000 from Höhnle) for 4 minutes.

The foam layer obtained was dusted on both sides with about 0.3 g of talc and completely dried in a vacuum drying cabinet at 75° C.

The foam obtained was uniformly sprayed with a 2% solution of polyvinylamine (K value 90) in a 7:3 w/w water/ethanol mixture so that the applied amount of polyvinylamine amounted to 8%. The foam was redried in a vacuum drying cabinet at 75° C. and then adjusted to a moisture content of 10% by spraying with water.

| | |
|---|---|
| Residual acrylic acid content: | 100 ppm |
| Polymer foam density: | 0.26 g/cm³ |
| Absorption capacity: | 45.8 g/g |
| FAR: | 4.6 g/g sec |

The compressing and bending strength as well as the residual acrylic acid content of the foamed articles obtained in the Comparative and Inventive Examples are given in Table 1.

TABLE 1

| Example | Polyamine | Add-on [%] | Compressive strength [rating] | Bending strength [rating] | Residual acrylic acid [ppm] |
|---|---|---|---|---|---|
| comp. 1 | — | — | 2 | 1 | 2900 |
| comp. 2 | — | — | 1 | 1 | 4500 |
| inv. 1 | PEI[a)] | 5 | 3 | 3 | 200 |
| inv. 2 | PEI[a)] | 10 | 4 | 3 | 80 |
| inv. 3 | PVAm[b)] | 4 | 3 | 3 | 300 |
| inv. 4 | PVAm[b)] | 8 | 4 | 3 | 100 |

[a)]PEI: Polyethyleneimine
[b)]PVAm: Polyvinylamine

TABLE 2

| Example | Tensile strength [kPa] | Strain at break [%] |
|---|---|---|
| comp. 1 | no measurable strength | not measurable |
| comp. 2 | no measurable strength | not measurable |
| inv. 2 | 20 | 20 |
| inv. 4 | 25 | 22 |

The data of Tables 1 and 2 reveal that coating with polyethyleneimine or polyvinylamine effects a significant improvement in wet strength with regard to all three relevant stress modes and also brings about a substantial reduction in the residual acrylic acid content.

We claim:

1. A process for the reduction of a residual monomer content and enhancement of a wet strength of articles formed from water absorbent crosslinked polymer foams containing units derived from monoethylenically unsaturated acids, which comprises adding at least 0.5% by weight of a polymer containing primary and/or secondary amino groups and having a molar mass of at least 300 to the water-absorbent crosslinked polymer foams.

2. The process of claim 1 wherein the polymer containing primary and/or secondary amino groups is used in an amount of 0.5% to 80%, by weight.

3. The process of claim 1 wherein the polymer containing primary and/or secondary amino groups is a polymer containing primary and/or secondary amino groups and having a molar mass from 500 to 5 million.

4. The process of claim 1 wherein the molar mass of the polymer bearing amino groups is from 1000 to 100,000.

5. The process of claim 1 wherein the polymer bearing amino groups comprises polymers containing vinylamine units, polyethyleneimines, polyvinyl guanidine, lysine condensates, and/or polyallylamines.

6. The process of claim 1 wherein the formed foam articles comprise water-absorbent crosslinked polymers of acrylic acid.

7. The process of claim 1 wherein the polymer containing primary and/or secondary amino groups is selected from the group consisting of polyethylenimines, crosslinked polyethylenimines, and amidated polyethylenimines having molar masses $M_w$ of from 500 to 3,000,000.

8. The process of claim 1 wherein the polymer containing primary and/or secondary amino groups is selected from the group consisting of vinylamine homopolymers, 1–99% hydrolyzed polyvinylformamides, copolymers of vinylformamide and vinyl acetate, vinyl alcohol, vinylpyrrolidone, and acrylamide, each having molar masses $M_w$ of 3000–2,000,000.

9. An article formed from a water-absorbent crosslinked polymer foam containing units derived from monoethylenically unsaturated acids, and obtainable by the process of claim 1.

10. The article of claim 9 wherein the article comprises a hygiene article.

11. The process of claim 1 wherein the polymer containing primary and/or secondary amino groups is used in an amount from 1% to 20%, by weight.

12. The article of claim 9 wherein the hygiene article is selected from the group consisting of an infant diaper, an incontinence product, a femcare article, a wound contact material, and a secondary wound dressing.

* * * * *